United States Patent
Xiong (10) Patent No.: US 9,974,129 B1
(45) Date of Patent: May 15, 2018

(54) CIRCUIT AND METHOD FOR LED CURRENT REGULATION AND RIPPLE CONTROL

(71) Applicant: Universal Lighting Technologies, Inc., Madison, AL (US)

(72) Inventor: Wei Xiong, Madison, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 0 days. days.

(21) Appl. No.: 15/596,813

(22) Filed: May 16, 2017

Related U.S. Application Data (60) Provisional application No. 62/376,780, filed on Aug. 18, 2016, provisional application No. 62/364,944, filed on Jul. 21, 2016.

(51) Int. Cl.
| | |
|---|---|
| *H05B 37/02* | (2006.01) |
| *H05B 33/08* | (2006.01) |
| *H02M 3/335* | (2006.01) |
| *H02M 1/14* | (2006.01) |
| *H02M 1/08* | (2006.01) |

(52) U.S. Cl.
CPC .......... *H05B 33/0818* (2013.01); *H02M 1/08* (2013.01); *H02M 1/14* (2013.01); *H02M 3/33523* (2013.01); *H05B 33/089* (2013.01); *H05B 33/0809* (2013.01); *H05B 33/0815* (2013.01); *H05B 33/0845* (2013.01); *H05B 33/0851* (2013.01); *H05B 33/0887* (2013.01)

(58) Field of Classification Search
CPC ............ H05B 33/0809; H05B 33/0815; H05B 33/0845; H05B 33/0887; H05B 33/089
USPC .......................................... 315/224, 294, 307
See application file for complete search history.

(56) References Cited

U.S. PATENT DOCUMENTS

| | | | | |
|---|---|---|---|---|
| 2012/0319621 | A1* | 12/2012 | Sutardja | H05B 33/0815 315/307 |
| 2013/0099691 | A1* | 4/2013 | Esaki | H05B 33/0815 315/210 |
| 2014/0140107 | A1* | 5/2014 | Chen | H02M 3/33523 363/21.15 |
| 2015/0271882 | A1* | 9/2015 | Melanson | H05B 33/0815 315/186 |
| 2017/0208660 | A1* | 7/2017 | Hilgers | H05B 33/0845 |
| 2017/0231045 | A1* | 8/2017 | Hu | H05B 33/0845 |

* cited by examiner

*Primary Examiner* — Tung X Le
(74) *Attorney, Agent, or Firm* — Patterson Intellectual Property Law, PC; Gary L. Montle; Jerry Turner Sewell (57) ABSTRACT

A current source generates an output current having a nominal DC magnitude between a current output node and a reference node. The output current varies with respect to the nominal DC magnitude by a time-varying magnitude. An LED load and a sensing resistor are connected in series between the current output node and the reference node to receive at least a first portion of the output current as a load current. The load current flows through the sensing resistor and generates a sensed voltage proportional to the load current. A current regulator connected between the current output node and the reference node receives a second portion of the output current as a shunt current. The current regulator also receives the sensed voltage, and selectively increases or decreases the shunt current to reduce the effect of the time varying magnitude of the output current on the load current.

6 Claims, 7 Drawing Sheets

CIRCUIT AND METHOD FOR LED CURRENT REGULATION AND RIPPLE CONTROL

CROSS-REFERENCES TO RELATED APPLICATIONS

This application claims benefit of the following patent applications which are hereby incorporated by reference: U.S. Provisional Patent App. No. 62/364,944 filed Jul. 21, 2016, entitled "Circuit and Method for LED Current Regulation and Ripple Control"; and U.S. Provisional Application No. 62/376,780 filed on Aug. 18, 2016, entitled "Circuit and Method for LED Current Regulation and Ripple Control."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The usage of light-emitting diodes (LEDs) to provide illumination is increasing rapidly as the cost of LEDs decrease and the endurance of the LEDs increases to cause the overall effective cost of operating LED lighting products to be lower than incandescent lamps and fluorescent lamps providing equivalent illumination. Also, LEDs can be dimmed by controlling the current through the LEDs because LEDs are current driven devices. The current through a plurality of LEDs in a lighting device must be controlled tightly in order to control the illumination provided by the LEDs. Typically, the secondary of an LED lighting device must be electrically isolated from the primary (line and neutral side) of the lighting device to meet applicable safety standards (e.g., IEC class II isolation). In addition, an LED driver circuit should have a high power factor and should have a constant current control.

One known solution to the foregoing requirements is to use a flyback converter to produce the DC in the secondary from the primary source. The flyback converter provides power factor correction to produce a high power factor, provides isolation between the primary and secondary circuits, and has a reasonably low cost. By using primary current sensing techniques to control the secondary current through the LEDs, the flyback converter provides an LED driver that is low in cost when compared with other topologies.

Figure 1:
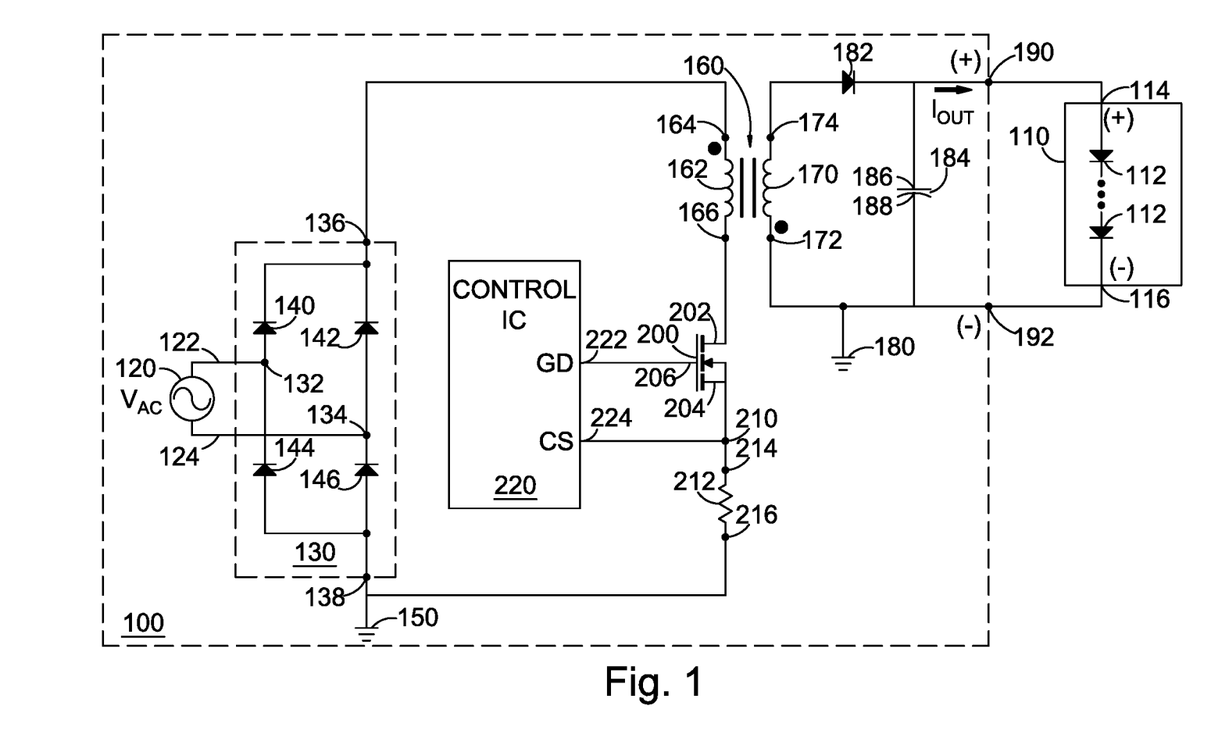
FIG. 1 illustrates a circuit diagram of a conventional LED driver circuit that includes a flyback converter controller on the primary of an isolation transformer and that provides a rectified secondary current to charge an output capacitor, the output capacitor providing current to an LED load.

FIG. 1 illustrates a typical LED driver circuit 100 based on a flyback converter. The LED driver circuit provides current to an LED load 110. In the illustrated embodiment, the LED load may comprise from two to five LEDs 112 connected in series between a first (+) LED load terminal 114 and a second (−) LED load terminal 116. A common load current flows through each LED in the LED load to cause the LEDs to illuminate. In alternative embodiments, the LED load may comprise additional LEDs in series or a series-parallel combination of LEDs. In order to provide consistent illumination, the load current through the LEDs should be maintained at a substantially constant magnitude.

The driver circuit utilizes a primary current sensing technique to control the secondary current. In the driver circuit, an AC source 120 provides an AC input voltage via first AC input line 122 and a second AC input line 124. In the illustrated embodiment, the AC input voltage may vary from 86 volts RMS to 265 volts RMS.

The AC input voltage between the first AC input line 122 and the second AC input line 124 is applied between a first input terminal 132 and a second input terminal 134 of a full-wave bridge rectifier 130. The bridge rectifier has a first (+) output terminal 136 and a second (−) output terminal 138. A first rectifier diode 140 has an anode connected to the first input terminal and a cathode connected to the first output terminal. A second rectifier diode 142 has an anode connected to the second input terminal and a cathode connected to the first output terminal. A third rectifier diode 144 has an anode connected to the second output terminal and has a cathode connected to the first input terminal. A fourth rectifier diode 146 has an anode connected to the second output terminal and has a cathode connected to the second input terminal. The bridge rectifier operates in a conventional manner to produce a pulsating DC voltage on the first output terminal which is referenced to the second output terminal. The second output terminal is connected to a primary ground reference 150.

The first (+) output terminal 136 of the bridge rectifier 130 is connected to a first terminal 164 of the primary winding 162 of an isolation transformer 160. The primary winding of the isolation transformer has a second terminal 166. The isolation transformer has a secondary winding 170, which has a first terminal 172 and a second terminal 174. The isolation transformer has an N:1 turns ratio between the primary winding and the secondary winding such that the voltage across the primary winding is N times the voltage across the secondary winding and such that the current through the secondary winding is N times the current through the primary winding.

As further illustrated in FIG. 1, the first terminal 172 of the secondary winding 170 of the isolation transformer 160 is connected to secondary ground reference 180. The secondary ground reference is electrically isolated from the primary ground reference 150. The second terminal 174 of the secondary winding is connected to the anode of a secondary diode 182. The cathode of the secondary diode is connected to the first (+) terminal 186 of a secondary filter capacitor 184. The secondary filter capacitor may also be referred to as an output filter capacitor. A second (−) terminal 188 of the secondary filter capacitor is connected to the secondary ground reference and thus to the first terminal of the secondary winding of the isolation transformer. In one embodiment, the secondary filter capacitor has a capacitance of approximately 2,000 microfarads. The cathode of the secondary diode and the first terminal of the secondary filter capacitor are connected to a first (+) output terminal 190 of the LED driver circuit 100. The secondary ground reference is connected to a second (−) output terminal 192 of the LED driver circuit.

As illustrated in FIG. 1, dots on the terminals of the primary winding 160 and the secondary winding 170 of the isolation transformer represent the magnetic coupling between the two windings. When the first terminal 162 of the primary winding is positive with respect to the second terminal 164 of the primary winding, the first terminal 172 of the secondary winding is also positive with respect to the second terminal 174 of the secondary winding; however, the current flow through the secondary winding is opposite the current flow through the primary winding. Thus, when current flows into the first terminal of the primary winding and flows to the second terminal of the primary winding with an increasing magnitude, the increasing current flow should induce current to flow from the second terminal of the secondary winding to the first terminal of the secondary winding (e.g., downward through the secondary winding toward the secondary ground reference 180) when the secondary winding terminals are oriented as shown in FIG. 1). However, induced current flow in that direction is blocked by the reverse-biased secondary diode 182. In contrast, when the magnitude of the current flowing from the first terminal to the second terminal of the primary winding decreases, current flow is induced in the secondary winding that flows from the first terminal of the secondary winding to the second terminal of the secondary winding (e.g., upward through the secondary winding when the secondary winding terminals are oriented as shown in FIG. 1). The current flowing out of the second terminal of the secondary winding passes through the forward-biased secondary diode.

The first (+) output terminal 190 of the LED driver circuit 100 is connected to the first (+) terminal 114 of the LED load 110. The second (−) terminal 116 of the LED load is connected to the secondary ground reference 180 via the second (−) output terminal 192 of the LED driver circuit.

As further shown in FIG. 1, the second terminal 166 of the primary winding 162 of the isolation transformer 160 is connected to a first terminal 202 of a semiconductor switch 200. The switch further includes a second terminal 204 and a control terminal 206. For example, the semiconductor switch may comprise a metal oxide semiconductor field effect transistor (MOSFET) wherein the first terminal is the drain of the MOSFET, the second terminal is the source of the MOSFET, and the control terminal is the gate of the MOSFET. In the illustrated embodiment, the MOSFET is an N-channel enhancement mode transistor, which has is normally off (e.g., has a high impedance between the drain and the source). The MOSFET turns on to provide a low-impedance path (e.g., a few tens of milliohms) between the drain and the source when a sufficiently large voltage differential is applied between the gate and the source of the MOSFET.

The second terminal (source) 204 of the MOSFET 200 is connected to a primary sensing node 210. The primary sensing node is also connected to a first terminal 214 of a primary sensing resistor 212. A second terminal 216 of the primary sensing resistor is connected to the primary ground reference 150. When the MOSFET is turned on, a current flows from the first (+) output terminal 136 of the bridge rectifier 130, through the primary winding 162 of the isolation transformer 160, through the MOSFET from the first terminal (drain) 202 to the second terminal (source), and through the primary sensing resistor to the primary ground reference.

The control terminal (gate) 206 of the MOSFET 200 is controlled by a gate drive (GD) output terminal 222 of an LED lighting controller integrated circuit ("control IC") 220. The LED lighting controller receives a feedback voltage via a current sense (CS) input terminal 224, which is connected to the primary sensing node 210. Thus, the LED controller receives a voltage proportional to the instantaneous current flowing through the primary sensing resistor 212. The current flowing through the primary sensing resistor is the same current flowing through primary winding 162 of the isolation transformer 160. Thus, the voltage developed across the primary sensing resistor from the primary sensing node to the primary ground reference 150 is proportional to the current flowing through the primary winding of the isolation transformer. Accordingly, the current sense input terminal of the LED lighting controller receives a voltage proportional to the current flowing through the primary winding of the isolation transformer.

In the illustrated embodiment, the LED lighting controller 220 comprises an MP4027 primary-side-control, offline LED lighting controller commercially available from Monolithic Power Systems (MPS) of San Jose, Calif. The LED lighting controller includes additional inputs (e.g., power input, ground reference, and compensation inputs), which are not shown in FIG. 1.

The LED lighting controller 220 operates in a conventional manner to output a high output signal on the gate control output terminal 222 to turn on the MOSFET 200 to cause current to flow through the primary winding 162 of the isolation transformer 160 from the first terminal 164 to the second terminal 166 of the primary winding. The current is allowed to build up to a selected magnitude in the primary winding as sensed via the primary sensing resistor 212. As discussed above, no current flows in the secondary winding 170 of the isolation transformer while current is flowing in the primary winding because the secondary diode 182 connected to the second terminal 174 of the secondary winding is reversed biased.

When the current flowing in the primary winding 160 reaches the selected magnitude, the LED lighting controller 220 turns off the MOSFET 200. The energy stored in the isolation transformer 160 is transferred to the secondary winding 170 and current flows out of the second terminal 174 of the secondary winding through the secondary diode 182 to the secondary filter capacitor 184 to charge the secondary filter capacitor. The voltage built up on the secondary filter capacitor is applied across the LED load 110 to provide current to cause the LEDs 112 within the LED load to illuminate.

The LED lighting controller 220 operates in a manner described in detail in the data sheets provided by the supplier to produce a DC current $I_{OUT}$ through the LED load 110 that is determined by the value of the primary sensing resistor 212. As set forth in the data sheets for the MP4027 controller from Monolithic Power Systems, the current through the LED load is controlled in accordance with the following approximate relationship:

$$I_{OUT} \approx (N \times V_{REF})/(2 \times R_{SENSE})$$

where $I_{OUT}$ is the current flowing through the LED load;

N is number of primary turns per each secondary turn;

$V_{REF}$ is an internal reference voltage within the LED lighting controller; and $R_{SENSE}$ is the resistance of the primary sensing resistor.

In one embodiment, the internal reference voltage $V_{REF}$ of the LED lighting controller 220 is approximately 0.413 volts, N is 5, and $R_{SENSE}$ is approximately 5.72 ohms. Thus, LED lighting controller controls the current through the LED load 110 to be approximately 180 milliamperes.

The LED driver circuit 100 shown in FIG. 1, which uses a flyback converter with primary current sensing, provides a simple and cost effective way to control the current through the LED load 110; however, testing has shown that the circuit in FIG. 1 does not provide adequate current regulation over a wide range of input voltages and over a range of the number of LEDs 112 in series within in the LED load. Furthermore, the ripple in the output current through the LED load is excessive.

Table 1 illustrates the results of testing the circuit of FIG. 1 over a range of input voltages and over a range of the number of LEDs connected in series within the LED load 110.

TABLE 1

Flyback Primary Sensing LED Driver Testing Data with 2,000 μF Output Capacitor

| No. of LEDs | $V_{IN}$ (volts) | $P_{IN}$ (watts) | $I_{OUT\_AVG}$ (mA) | $I_{OUT\_MAX}$ (mA) | $I_{OUT\_MIN}$ (mA) | $V_{OUT}$ (volts) | Ripple (%) | Line Reg. (%) | Load Reg. (%) |
|---|---|---|---|---|---|---|---|---|---|
| 5 | 86  | 3.46 | 179.7 | 209 | 150 | 13.86 | 16.30 |      | 15.75 |
|   | 265 | 3.87 | 181.5 | 207 | 153 | 13.86 | 14.05 | 1.00 |       |
| 4 | 86  | 2.84 | 185   | 220 | 149 | 11.1  | 18.92 |      |       |
|   | 265 | 3.3  | 189   | 221 | 153 | 11.1  | 16.93 | 2.16 |       |
| 3 | 86  | 2.23 | 190   | 235 | 145 | 8.4   | 23.68 |      |       |
|   | 265 | 2.72 | 198   | 239 | 151 | 8.4   | 20.71 | 4.21 |       |
| 2 | 86  | 1.6  | 196   | 256 | 133 | 5.6   | 30.61 |      |       |
|   | 265 | 2.1  | 208   | 265 | 143 | 5.6   | 27.40 | 6.12 |       |

As illustrated in Table 1, the target LED load current is 180 milliamperes. The input voltages from the AC source 120 range from approximately 86 volts RMS to approximately 265 volts RMS. The LED load 110 ranges from two LEDs 112 in series (requiring approximately 5.6 volts across the LED load) to five LEDs in series (requiring approximately 13.9 volts across the LED load). The testing data in Table 1 show that the line regulation (the change in average LED current caused by input line voltage change) can be as high as 6.12% for two LEDs in series within the LED load. The testing data in Table 1 further show that the load regulation (the change in LED current in response to changes in the LED load over the input voltage range) is approximately 15.75% (e.g., [(208 mA−179.7 mA)/179.7 mA]×100=15.75%). As further illustrated in Table 1, the ripple of the current through the LED load is measured to be in a range from approximately 14% to approximately 31% over a range of input voltages and a range of LEDs connected in series.

For acceptable operation, an LED driver circuit 100 should provide line regulation and load regulation of the current to be less than 5% and should maintain the ripple to be less than 20%. Although the ripple can be reduced by increasing the capacitance of the secondary filter capacitor 184, filter capacitors having capacitances greater than 2,000 microfarads at the required voltages can be quite large and expensive. The size and cost at least partially reduce the cost effectiveness and practicality of the illustrated circuit.

The primary side current sensing technique performed by the LED driver circuit 100 of FIG. 1 is based on the above-described approximate relationship between the measured voltage across the primary sensing resistor 212 on the primary side and the actual current through the LED load 110 on the secondary side. Because of the approximate relationship, the LED current regulation cannot be improved easily by modifying the primary side of the driver circuit.

Accordingly, a need exists for a circuit and a method for improving the current regulation and reducing the output current ripple of the LED driver circuit based on a flyback converter that is controlled by primary side current sensing.

SUMMARY OF THE INVENTION

An aspect of the embodiments disclosed herein is a current source that generates an output current having a nominal DC magnitude between a current output node and a reference node. The output current varies with respect to the nominal DC magnitude by a time-varying magnitude. An LED load and a sensing resistor are connected in series between the current output node and the reference node to receive at least a first portion of the output current as a load current. The load current flows through the sensing resistor and generates a sensed voltage proportional to the load current. A current regulator connected between the current output node and the reference node receives a second portion of the output current as a shunt current. The current regulator also receives the sensed voltage, and selectively increases or decreases the shunt current to reduce the effect of the time varying magnitude of the output current on the load current.

Another aspect of the embodiments disclosed herein is a circuit for providing a load current to a load. The circuit comprises a driver circuit having an isolation transformer that includes a primary winding and a secondary winding. The driver circuit includes a flyback converter controller that selectively applies a pulsing DC voltage to the primary winding to generate a current in the secondary winding. The secondary winding is coupled to a diode configured to provide a rectified secondary current to charge a secondary filter capacitor. The secondary filter capacitor is connected between a first output terminal and a second output terminal. The driver circuit includes a sensing resistor in series with the primary winding of the isolation transformer. The sensing resistor is configured to generate a primary sensed voltage responsive to the rectified secondary current. The flyback converter controller is configured to respond to the magnitude of the primary sensed voltage to control the magnitude of the rectified secondary current to maintain the magnitude of the rectified secondary current within a first range of magnitudes between a first lower magnitude and a first upper magnitude, wherein a difference between the first upper magnitude and the first lower magnitude is a first magnitude difference. A secondary sensing resistor has a first resistor terminal connected to the first output terminal and has a second resistor terminal connectable to a load. The second output terminal is connectable to the load. The secondary sensing resistor generates a secondary sensed voltage proportional to the load current flowing through the secondary sensing resistor. A current regulator is connected between the first and second output terminals. The current regulator includes a reference voltage. The current regulator is configured to receive the secondary sensed voltage from the secondary sensing resistor and to selectively enable a shunt current to pass through the current regulator when the secondary sensed voltage exceeds the reference voltage to divert a portion of the rectified current from the load. The current regulator is configured to control the current through the secondary sensing resistor to a controlled current magnitude that varies within a second range of magnitudes between a second lower magnitude and a second upper magnitude, wherein a difference between the second upper magnitude and the second lower magnitude is a second magnitude difference. The second magnitude difference as a percentage of the second lower magnitude is less than the first magnitude difference as a percentage of the first lower magnitude.

In certain embodiments in accordance with this aspect, the current regulator comprises an amplifier having an input coupled to the second resistor terminal, the amplifier configured the secondary sensed voltage to generate an amplified voltage. A comparator is configured to compare the amplified voltage to a reference voltage. The comparator is further configured to generate a comparator output signal having a first voltage level when the amplified voltage is greater than the reference voltage and having at least a second voltage level when the amplified voltage is less than the reference voltage. A transistor has a first transistor terminal, a second transistor terminal and a controllable current path between the first and second transistor terminals. The first transistor terminal is coupled to a first output terminal. The second transistor terminal is coupled to the second output terminal. The controllable current path is controllable by a control terminal of the transistor to have a variable conductance. The control terminal is coupled to receive a voltage responsive to the comparator output signal. The transistor is configured to respond to the comparator output signal to control the conductance of the current path to selectively increase or decrease the shunt current through the current regulator.

In certain embodiments in accordance with this aspect, the current regulator comprises a shunt regulator. The shunt regulator includes a first regulator terminal coupled to the first output terminal and a second regulator terminal coupled to the second output terminal. A voltage sensing terminal of the shunt regulator is coupled to the second resistor terminal to receive the secondary sensed voltage. The shunt regulator includes an internal voltage reference configured to provide an internal reference voltage. An electrical path between the first terminal of the shunt regulator and the second terminal of the shunt regulator has a variable conductivity. The shunt regulator is configured to respond to the secondary sensed voltage to increase the variable conductivity of the electrical path to increase current flow through the shunt regulator when the secondary sensed voltage is greater than the internal reference voltage and to decrease the variable conductivity of the electrical path to decrease current flow through the shunt regulator when the second sensed voltage is less than the internal reference voltage.

Another aspect of the embodiments disclosed herein is a circuit for providing a load current to a load. The circuit comprises a current source configured to generate an output current having a nominal DC magnitude between a current output node and a reference node. The output current varies with respect to the nominal DC magnitude by a time varying magnitude. A sensing resistor has a first resistor terminal and a second resistor terminal. The first resistor terminal is connected to one of the current output node and the reference node configured to provide a first portion of the output current as a load current. The sensing resistor is configured to generate a sensed voltage proportional to the load current. A current regulator is connected between the current output node and the reference node to receive a shunt current comprising at least a second portion of the output current. The current regulator is configured to receive the sensed voltage and to selectively increase or decrease the shunt current to reduce the effect of the time varying magnitude of the output current on the load current.

In certain embodiments in accordance with this aspect, the current regulator comprises an amplifier configured to amplify the sensed voltage to generate an amplified voltage. The current regulator further comprises a comparator configured to compare the amplified voltage to a reference voltage. The comparator is further configured to generate a comparator output signal having at a first voltage level when the amplified voltage is greater than the reference voltage and having at least a second voltage level when the amplified voltage is less than the reference voltage. A transistor has a first transistor terminal, a second transistor terminal and a controllable current path between the first and second transistor terminals. The first transistor terminal is coupled to the current output node of the current source. The second transistor terminal is coupled to the reference node of the current source. The controllable current path is controlled by a control terminal of the transistor to have a variable conductance. The control terminal of the transistor is coupled to receive a voltage responsive to the comparator output signal. The transistor is configured to respond to the comparator output signal to control the conductance of the current path to selectively increase or decrease the shunt current through the current regulator.

In certain embodiments in accordance with this aspect, the current regulator comprises a first regulator terminal coupled to the current output node of the current source and a second regulator terminal coupled to the reference node of the current source. A voltage sensing terminal is coupled to the sensing resistor to receive the sensed voltage. The current regulator includes an internal voltage reference configured to provide an internal reference voltage. The current regulator includes an electrical path between the first regulator terminal and the second regulator terminal. The electrical path has a variable conductivity. The shunt regulator is configured to respond to the sensed voltage to increase the variable conductivity of the electrical path to increase current flow through the shunt regulator when the sensed voltage is greater than the internal reference voltage and to decrease the variable conductivity of the electrical path to decrease current flow through the shunt regulator when the sensed voltage is less than the internal reference voltage.

Another aspect of the embodiments disclosed herein is a method for controlling a load current to a light-emitting diode (LED) load. The method includes generating an output current controlled to maintain a magnitude of the output current between a first lower magnitude and a first upper magnitude, wherein a difference between the first lower magnitude and the first upper magnitude is a first magnitude difference corresponding to a first percentage of variation with respect to the first lower magnitude. The method further includes applying a first portion of the output current to a current shunt, and applying a second portion of the output current to the LED load to cause the second portion of the output current to flow through the LED load. The method includes sensing a feedback signal responsive to a magnitude of the second portion of the output current. The method further includes applying the feedback signal to the current shunt. The current shunt is responsive to the feedback signal to selectively vary a magnitude of the first portion of the output current to thereby vary the magnitude of the second portion of the output current to maintain the second portion of the output current between a second lower current magnitude and a second upper current magnitude. A second magnitude difference between the second upper current magnitude and the second lower current magnitude corresponds to a second percentage of variation with respect to the second lower magnitude. The second percentage of variation is less than the first percentage of variation.

DETAILED DESCRIPTION OF THE INVENTION

Figure 2:
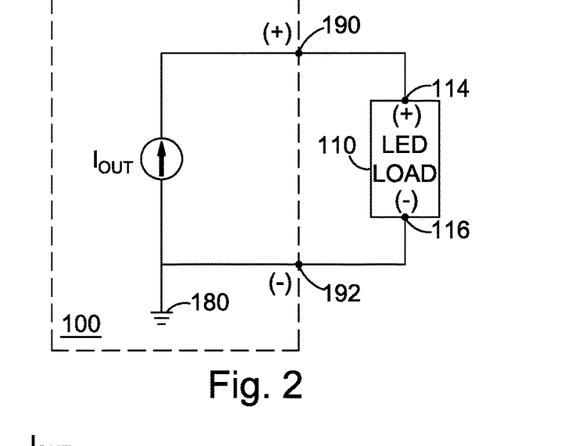
FIG. 2 illustrates a modified circuit diagram of the LED driver circuit and the LED load of FIG. 1, wherein the LED driver circuit is represented as a current source.

To assist in understanding the circuit and method described below, the driver circuit 100 illustrated in FIG. 1 is represented in FIG. 2 with the symbol of a current source that produces a controlled output current $I_{OUT}$ that drives the LED load 110. The LED driver circuit (current source) in FIG. 2 controls the current through the LED load in the manner described above and thus exhibits the issues with current regulation and ripple represented by Table 1.

Figure 3:
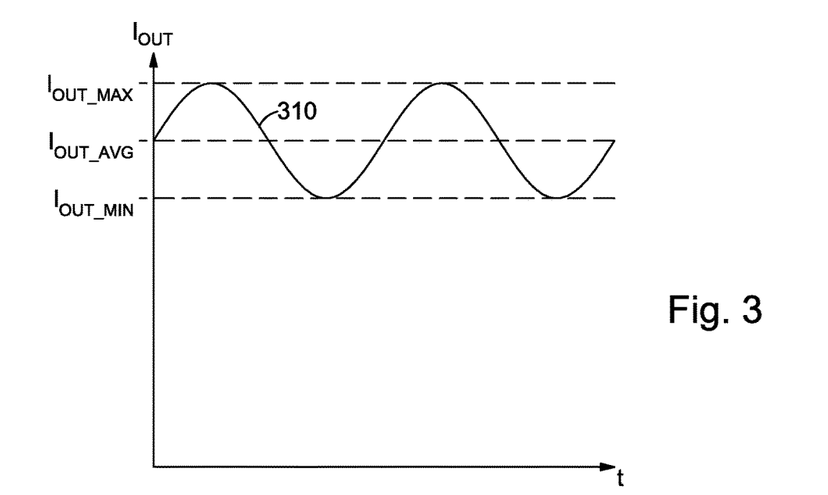
FIG. 3 illustrates the time-varying current provided by the LED driver circuit of FIGS. 1 and 2 showing the ripple current superimposed on the average output current.

FIG. 3 illustrates a current waveform 310 that represents the current $I_{OUT}$ provided by the LED driver circuit (current source) 100 of FIG. 2. The current waveform is shown as having a DC component $I_{OUT\_AVG}$ that results from the current control provided by the current source. For example, the current may be controlled to have a DC component value of approximately 180 milliamperes for a particular type of LED in the LED load 110. A time-varying ripple component is superimposed on the DC component. The time-varying ripple component is referred to herein as a "quasi-AC" component because the time-varying component varies about the DC component value rather than about zero. Thus, the time-varying ripple component does not flow in the opposite direction (e.g., negatively) during any portion of the cycle of the ripple component. The quasi-AC ripple component causes the current waveform to vary from a minimum current value, $I_{OUT\_MIN}$, to a maximum current value, $I_{OUT\_MAX}$, wherein the average current value, $I_{OUT\_AVG}$, is midway between the minimum current value and the maximum current value.

The relative magnitude of the quasi-AC ripple component as a percentage of the DC component may be determined by the following relationship:

$$\text{RIPPLE } (\%)_{I_{OUT}} = \left[ \frac{I_{OUT\_MAX} - I_{OUT\_MIN}}{I_{OUT\_AVG}} \right] \times 100$$

As illustrated above in Table 1, in one embodiment, the relative magnitude of the quasi-AC ripple component may vary from approximately 14% to approximately 31% of the DC component. Typically, the ripple has a frequency of twice the line frequency (e.g., 120 Hz for when the current source is derived from a 60 Hz AC source).

Figure 4:
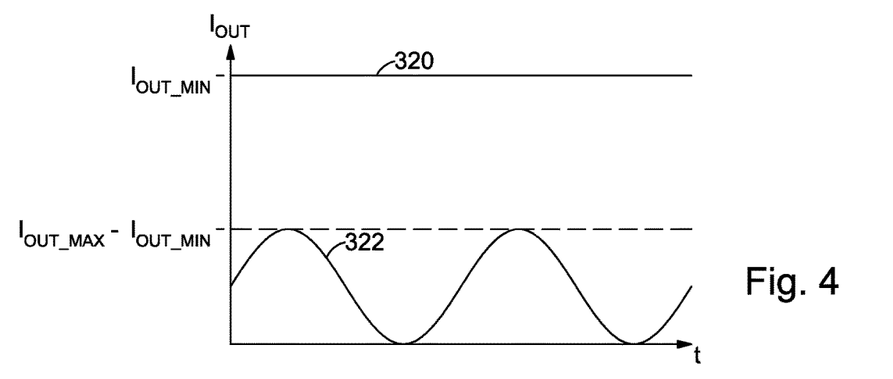
FIG. 4 illustrates the time-varying current of FIG. 3 with the minimum current value of FIG. 3 shown as a constant DC current and with the time-varying ripple current of FIG. 3 shown as a separate time-varying current.

The $I_{OUT}$ waveform 310 of FIG. 3 can be mathematically separated into two components as illustrated in FIG. 4. A DC component 320 has a magnitude corresponding to the minimum current value, $I_{OUT\_MIN}$ of FIG. 3. A quasi-AC component 322 is a time-varying component that varies about a DC offset current magnitude rather than about zero. The quasi-AC component has a magnitude corresponding to the peak-to-peak ripple of the waveform in FIG. 3. Thus, the AC component has a peak-to-peak magnitude of $I_{OUT\_MAX} - I_{OUT\_MIN}$. Adding the DC component and the quasi-AC component of FIG. 4 together results in the quasi-AC current waveform of FIG. 3.

Figure 5:
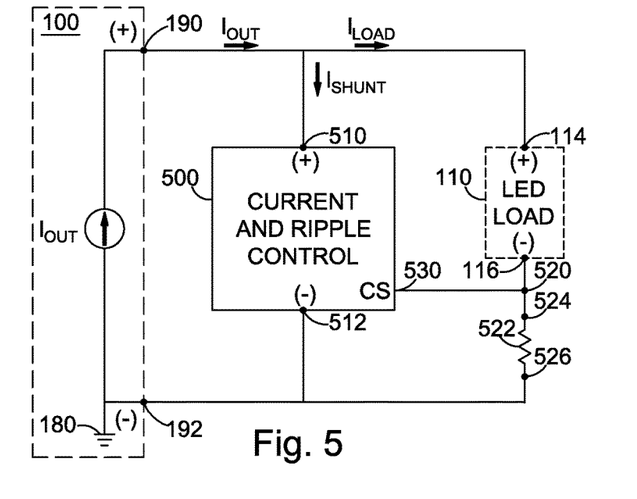
FIG. 5 illustrates a block diagram of the LED driver circuit—again represented as a current source—and the LED load of FIG. 2, and further including a ripple and control circuit connected across the output terminals of the LED driver circuit.

Elimination (or at least a substantial reduction) of the quasi-AC component 322 of FIG. 4 results in a current having only the DC component 320 having the magnitude $I_{OUT\_MIN}$ as shown in FIG. 4. FIG. 5 illustrates a block diagram of a current and ripple control circuit 500 that separates the quasi-AC component from the DC component to produce a DC-only current that is applied to the LED load 110. A first (+) terminal 510 of the current and ripple control circuit is connected to the first (+) output terminal 190 of the LED driver circuit (again represented as a current source) 100. A second (−) terminal 512 of the current and ripple control circuit is connected to the second (−) output terminal of the LED driver circuit and is thereby connected to the secondary ground reference 180. The first (+) terminal 114 of the LED load is connected to the first (+) terminal of the current and ripple control circuit. The second (−) terminal 116 of the LED load is connected to a secondary sensing node 520. A secondary sensing resistor 522 has a first terminal 524 connected to the secondary sensing node and has a second terminal 526 connected to the second (−) terminal of the current and ripple control circuit. Thus, the second terminal of the secondary current sensing resistor is connected to the secondary ground reference. The secondary sensing node is connected a current sense (CS) input 530 of the current and ripple control circuit. The current flowing through the secondary sensing resistor is substantially equal to the load current flowing through the LED load. Thus, the secondary sensing node develops a voltage proportional to the load current.

As described above, the voltage on the secondary current sensing node 520 is provided as a feedback signal to the current sense (CS) input 530 of the current and ripple control circuit 500. As described below, the current and ripple control circuit is responsive to the feedback signal to sense when the load current has a magnitude greater than the $I_{OUT\_MIN}$ magnitude of the DC component shown in FIGS. 2 and 3. As further described below, the current and ripple control circuit bypasses the current in excess of $I_{OUT\_MIN}$ to the secondary ground reference 180 such that the current through the LED load is maintained substantially constant at the magnitude $I_{OUT\_MIN}$.

Figure 6:
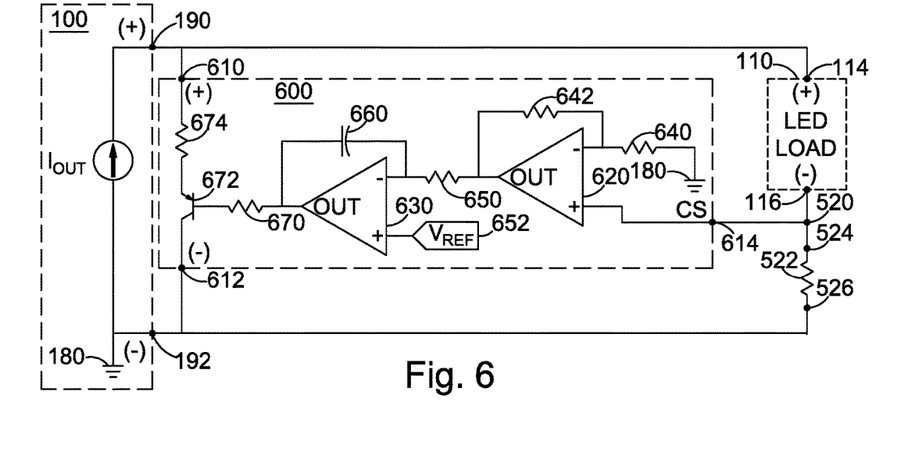
FIG. 6 illustrates a first embodiment of the current and ripple control circuit of FIG. 5 implemented with a pair of operational amplifiers and an output transistor.

FIG. 6 illustrates an implementation of a current and ripple control circuit 600 that corresponds to the current and ripple control circuit 500 of FIG. 5. In FIG. 6, the LED driver circuit 100 of FIG. 1 is again illustrated as a constant current source having the issues described above with respect to FIGS. 1 and 2. A first (+) terminal 610 of the current and ripple control circuit is connected to the first (+) output terminal 190 of the LED driver circuit. A second (−) terminal 612 of the current and ripple control circuit is connected to the second (−) output terminal 192 of the LED driver circuit and is thereby connected to the secondary ground reference 180.

In FIG. 6, the LED load 110 is also illustrated as before. The first (+) terminal 114 of the LED load is connected to the first (+) terminal of the current and ripple control circuit and thus to the first (+) output terminal 190 of the LED driver circuit 100. The second (−) terminal 116 of the LED load is connected to the secondary sensing node 520 and thus to the first terminal 524 of the secondary sensing resistor 522. The second terminal of the secondary sensing resistor is connected to the secondary ground reference 180 via the second output terminal 192 of the LED driver circuit. The secondary sensing node is connected to a current sense (CS) input 614 of the current and ripple control circuit, which corresponds to the current sense (CS) input 530 of the current and ripple control circuit 500 of FIG. 5.

The current and ripple control circuit 600 of FIG. 6 comprises a first operational amplifier 620 and a second operational amplifier 630. Each operational amplifier includes a respective inverting (−) input, a respective noninverting (+) input and a respective output (OUT). Each operational amplifier has respective power and ground connections that are not illustrated in FIG. 6.

The noninverting (+) input of the first operational amplifier 620 is connected to the current sense (CS) input terminal 614 of the current and ripple control circuit 600. Thus, the noninverting input is connected to the secondary sensing node 520. The connection to the secondary sensing node causes a voltage to be applied to the noninverting input of the first operational amplifier proportional to the load current flowing through the secondary sensing resistor 522. In one particular embodiment, the secondary sensing resistor has a very low resistance of approximately 0.1 ohm, for example, such that when 180 milliamperes of load current flows through the resistor, a voltage of approximately 18 millivolts develops across the resistor. Because of the low resistance, very little power (e.g., approximately 3 milliwatts) is dissipated in the secondary sensing resistor.

The inverting (−) input of the first operational amplifier 620 is connected to the secondary ground reference 180 via a first gain control resistor 640 having a resistance $R_{640}$. The inverting input of the first operational amplifier is also connected to the output (OUT) of the first operational amplifier via a second gain control resistor 642 having a resistance $R_{642}$. As is well known for operational amplifiers connected in this manner, the gain (K) of the first operational amplifier is defined as:

$$K=1+(R_{642}/R_{640})$$

The values of the two gain control resistors are selected to provide a desired gain. For example, a gain (K) of 100 can be obtained by selecting the second gain control resistor to have a resistance $R_{642}$ that is approximately 99 times the resistance $R_{640}$ of the first gain control resistor. With a selected gain (K) of 100, the voltage on the output (OUT) of the first operational amplifier will be approximately 1.8 volts when the load current is approximately 180 milliamperes and the voltage on the secondary sensing node 520 is approximately 18 millivolts.

The output (OUT) of the first operational amplifier 620 is coupled to the inverting (−) input of the second operational amplifier 630 via a forward coupling resistor 650 having a resistance $R_{650}$. For example, the resistance of the forward coupling resistor may be approximately 10,000 ohms. The noninverting (+) input of the second operational amplifier is connected to a fixed reference voltage 652 that provides a substantially constant voltage having a magnitude $V_{REF}$. In the illustrated embodiment, the reference voltage is selected to be approximately 1.8 volts to correspond to the magnitude of the voltage on the output (OUT) of the first operational amplifier when the load current through the secondary sensing resistor 522 is approximately 180 milliamperes. The inverting input of the second operational amplifier is also connected to the output (OUT) of the second operational amplifier via a feedback capacitor 660. Accordingly, the second operational amplifier is configured as an integrating comparator. In one embodiment, the feedback capacitor has a capacitance of approximately 1 microfarad. The capacitor 660 and the resistor 650 form an integrating control loop.

The second operational amplifier 630 produces a voltage on the output (OUT) of the second operational amplifier that is responsive to the difference between the reference voltage $V_{REF}$ on the noninverting (+) input and the amplified voltage from the first operational amplifier 620 on the inverting (−) input. If the amplified voltage is greater than the reference voltage because the sensed load current is greater than the desired load current, the second operational amplifier will reduce the voltage on the output of the second operational amplifier. If the amplified voltage is less than the reference voltage because the sensed load current is less than the desired load current, the second operational amplifier will increase the voltage on the output of the second operational amplifier. The resistance of the forward coupling resistor 650 and the capacitance of the feedback capacitor 660 determine the rate at which the voltage on the output of the second operational amplifier changes in response to changes in the amplified voltage on the inverting input caused by changes in the load current.

The output (OUT) of the second operational amplifier 630 is coupled via a base resistor 670 to the base of a PNP bipolar transistor 672. The collector of the transistor is connected to the second (−) input 612 of the current and ripple control circuit 600 and is thus connected to the secondary ground reference 180. The emitter of the transistor is connected via a current limiting resistor 674 to the first (+) input terminal 610 of the current and ripple control circuit 600. The output of the second operational amplifier controls the base current of the transistor. The base resistor limits the base current to protect the base of the transistor from an overcurrent condition. For example, in one embodiment, the base resistor has a resistance of approximately 10,000 ohms. Similarly, the current limiting resistor in the emitter circuit protects the collector-emitter junction of the transistor from an overcurrent condition. For example, in one embodiment, the current limiting resistor has a resistance of approximately 200 ohms.

The current and ripple control circuit 600 operates by controlling the base current of the transistor 672 to selectively bypass current from the first (+) terminal 610 of the current and ripple control circuit to the secondary ground reference 180 via the second (−) terminal 612 of the current and ripple control circuit. For example, when the load current through the secondary sensing resistor 522 exceeds the desired current (e.g., exceeds 180 milliamperes in the illustrated embodiment), the voltage on the output (OUT) of the second operational amplifier 630 decreases. The decreased voltage on the output of the second operational amplifier decreases the voltage on the base of the transistor, which increases the emitter-collector current flowing from the first input of the current and ripple control circuit to the secondary ground reference. Thus, a portion of the current provided by the LED driver circuit 100 is bypassed (shunted) to the secondary ground reference, which reduces the current available for the LED load 110.

In contrast to the foregoing example, when the load current through the secondary sensing resistor 522 is less than the desired current, the voltage on the output (OUT) of the second operational amplifier 630 increases. The increased voltage on the output of the second operational amplifier increases the voltage on the base of the transistor 672, which decreases the emitter-collector current flowing from the first input 610 of the current and ripple control circuit to the secondary ground reference 180. This reduces the portion of the current bypassed (shunted) to the secondary ground reference and thus increases the current available for the LED load 110.

Figure 7:
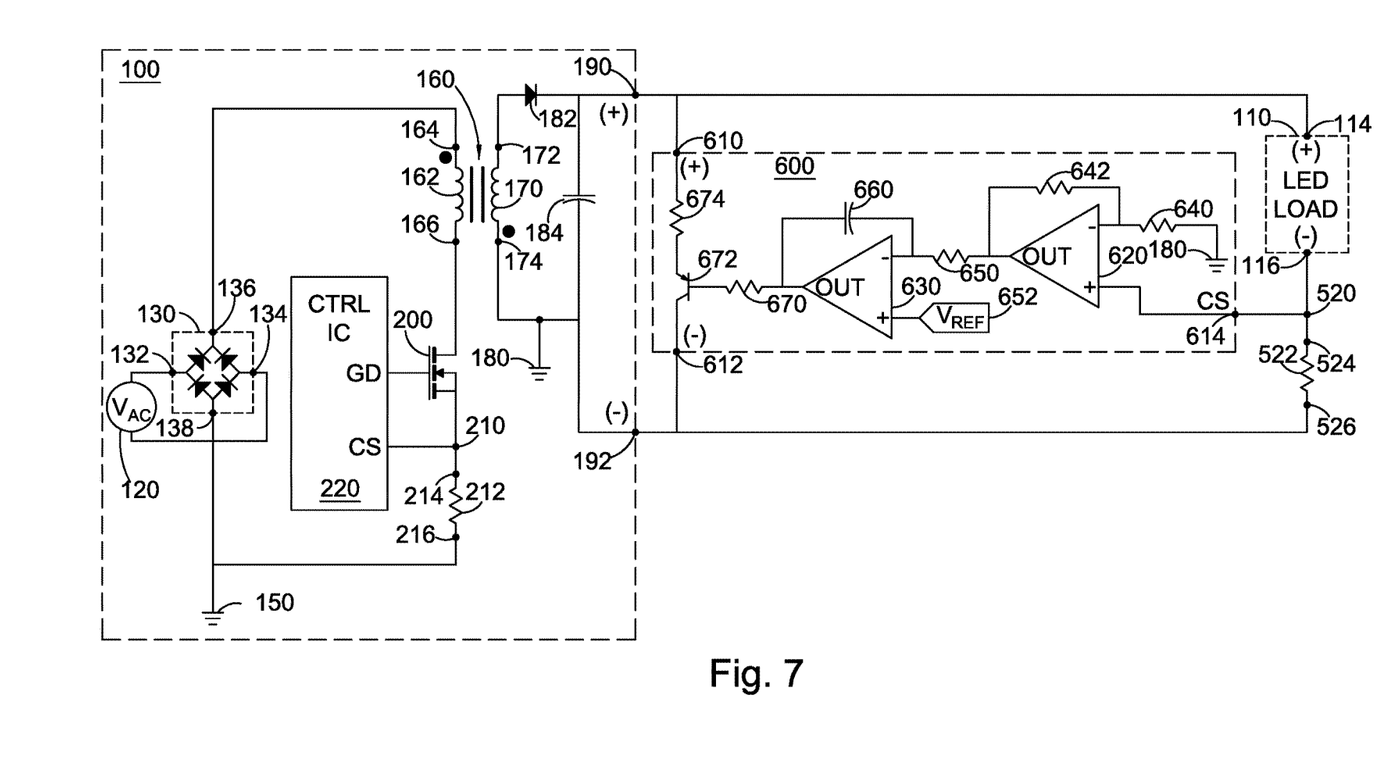
FIG. 7 illustrates the combination of the LED driver circuit and the LED load of FIG. 1, and further including the current and ripple control circuit of FIG. 6.

FIG. 7 illustrates a complete circuit diagram of the LED driver circuit 100, the current and ripple control circuit 600 of FIG. 6 and the LED load 110. When the LED driver circuit and the current and ripple control circuit are operated together to control the current through the LED load, the secondary sensing resistor 522 has a resistance selected to provide a voltage proportional to the desired load current that is amplified by the first operational amplifier. The amplified voltage is compared to the reference voltage applied to the noninverting (+) input 630 of the second operational amplifier. In the illustrated example, the resistance is selected such that the sensed voltage at the desired load current of 180 milliamperes is approximately 0.18 volt. The desired load current of 180 milliamperes corresponds to the $I_{OUT\_MIN}$ magnitude of the output current ($I_{OUT}$) in FIGS. 3 and 4. The resistance of the primary sensing resistor 212 in the LED driver circuit is selected to maintain the average magnitude of the overall secondary current (as sensed in the primary sensing resistor) at the magnitude $I_{OUT\_AVG}$ shown in FIG. 3 such that the ripple current 310 is superimposed on the output current. The current and ripple control circuit operates to shunt the quasi-AC ripple current 322 in FIG. 4 to the secondary ground reference 180 such that a substantially constant DC current, represented by the current 320 in FIG. 4) is provided to LED load. The LED load current is maintained at approximately the $I_{OUT\_MIN}$ magnitude shown in FIGS. 3 and 4.

As illustrated by two foregoing examples, the current and ripple control circuit 600 operates as a closed loop feedback system to selectively bypass (shunt) a portion of the current provided by the LED driver circuit 100 to maintain the current through the LED load 110 at a substantially constant magnitude even if the current provided by the LED driver circuit has substantial ripple, as illustrated in FIG. 3, and even if the magnitude of the current from the LED driver circuit changes because of poor load current regulation or poor line current regulation as illustrated in Table 1.

The benefits of the current and ripple control circuit on reducing the percent of load current regulation, the percent of line current regulation and reducing the ripple are illustrated in the following Table 2.

TABLE 2

Flyback Primary Sensing LED Driver Testing Data with Current and Ripple Control and with 1,000 µF Output Capacitor

| No. of LEDs | $V_{IN}$ (volts) | $P_{IN}$ (watts) | $I_{OUT\_AVG}$ (mA) | $I_{OUT\_MAX}$ (mA) | $I_{OUT\_MIN}$ (mA) | $V_{OUT}$ (volts) | Ripple (%) | Line Reg. (%) | Load Reg. (%) |
|---|---|---|---|---|---|---|---|---|---|
| 5 | 86 | 4.03 | 177.5 | 196 | 150 | 13.9 | 10.42 | | 1.97 |
|   | 265 | 4.56 | 177.8 | 194 | 159 | 13.9 | 9.11 | 0.17 | |
| 4 | 86 | 3.44 | 177.7 | 197 | 159 | 11.12 | 10.86 | | |
|   | 265 | 4 | 177.8 | 196 | 158 | 11.12 | 10.24 | 0.06 | |
| 3 | 86 | 2.82 | 177.6 | 197 | 158 | 8.42 | 10.92 | | |
|   | 265 | 3.44 | 178.4 | 198 | 158 | 8.42 | 10.99 | 0.45 | |
| 2 | 86 | 2.21 | 178 | 197 | 161 | 5.61 | 10.67 | | |
|   | 265 | 2.85 | 181 | 202 | 160 | 5.61 | 11.60 | 1.69 | |

The improved current regulation and reduced ripple illustrated by the data in Table 2 resulted from testing of the LED driver circuit 100 with the capacitance of the secondary filter capacitor 184 reduced from 2,000 microfarads to 1,000 microfarads. As shown in Table 2, the line regulation is approximately 1.69% compared to the previous line regulation of approximately 6.12%. The load regulation is approximately 1.97% (e.g., [(181 mA−177.5 mA)/177.5 mA]×100=1.97%) compared to the previous load regulation of approximately 15.75%. The greatest percentage of output ripple is less than approximately 11% compared to the previous percentage of output ripple of almost 31%. As further shown by the data in Table 2, the output ripple is reasonably consistent in a range from approximately 9% to approximately 12% in comparison to the previous greater range from approximately 14% to approximately 31%.

Figure 8:
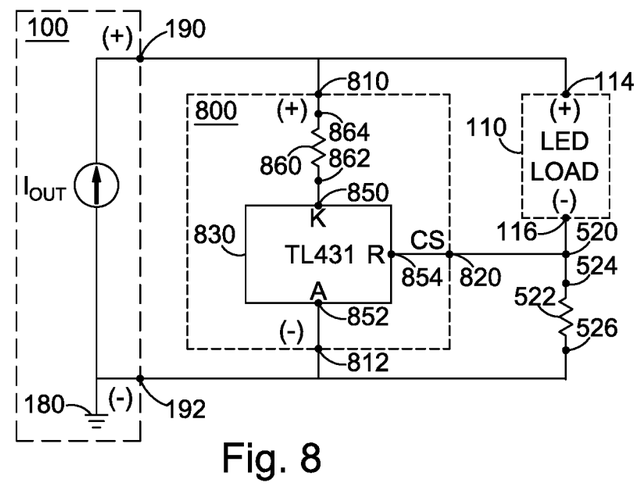
FIG. 8 illustrates a second embodiment of the current and ripple control circuit of FIG. 5 implemented with a shunt regulator, such as, for example, a commercially available TL431 shunt regulator.

FIG. 8 illustrates a second implementation of a current and ripple control circuit 800, which may be used when the load current through the LED load 110 is smaller (e.g., around 50 milliamperes) such that power dissipation is smaller. As illustrated in FIG. 8, the LED driver circuit 100, the LED load 110, the secondary sensing node 520, and the secondary sensing resistor 522 are connected as previously described. The current and ripple control circuit has a first (+) terminal 810 connected to the first (+) output terminal 190 of the LED driver circuit and to the first (+) terminal 114 of the LED load. The current and ripple control circuit has a second (−) terminal 812 connected to the second (−) output terminal 192 of the LED driver circuit and to the secondary ground reference 180. The current and ripple control circuit has a current sensing (CS) input 820 connected to the secondary sensing node and thus to the first terminal 524 of the secondary sensing resistor.

As further illustrated in FIG. 8, the current and ripple control circuit 800 comprises a three-terminal shunt regulator 830 such as, for example, a TL431 Precision Programmable Reference, which is commercially available from Texas Instruments Incorporated of Dallas, Tex., from ON Semiconductor of Phoenix, Ariz., and from a number of other sources. Additional information regarding the structure and the operation of the shunt regulator can be found in datasheets published by the suppliers.

The shunt regulator 830 has a cathode (K) terminal 850, an anode (A) terminal 852 and a reference (R) terminal 854. The cathode terminal of the shunt regulator is connected to a first terminal 862 of a current-limiting resistor 860. A second terminal 864 of the current-limiting resistor is connected to the first (+) terminal 810 of the current and ripple control circuit 800. The current-limiting resistor operates to limit the maximum current flow through the shunt regulator. For example, in one embodiment, the current-limiting resistor has a resistance of approximately 200 ohms. The anode terminal of the shunt regulator is connected to the second (−) terminal 812 of the current and ripple control circuit and is thus connected to the secondary ground reference 180. The reference terminal of the shunt regulator is connected to the current sensing input 820 of the current and ripple control circuit.

Figure 9:
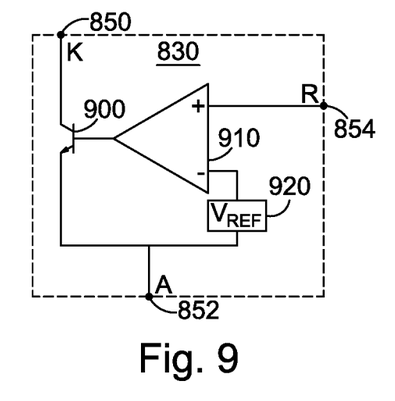
FIG. 9 illustrates a simplified block diagram of the TL431 shunt regulator of FIG. 8.
Figure 10:
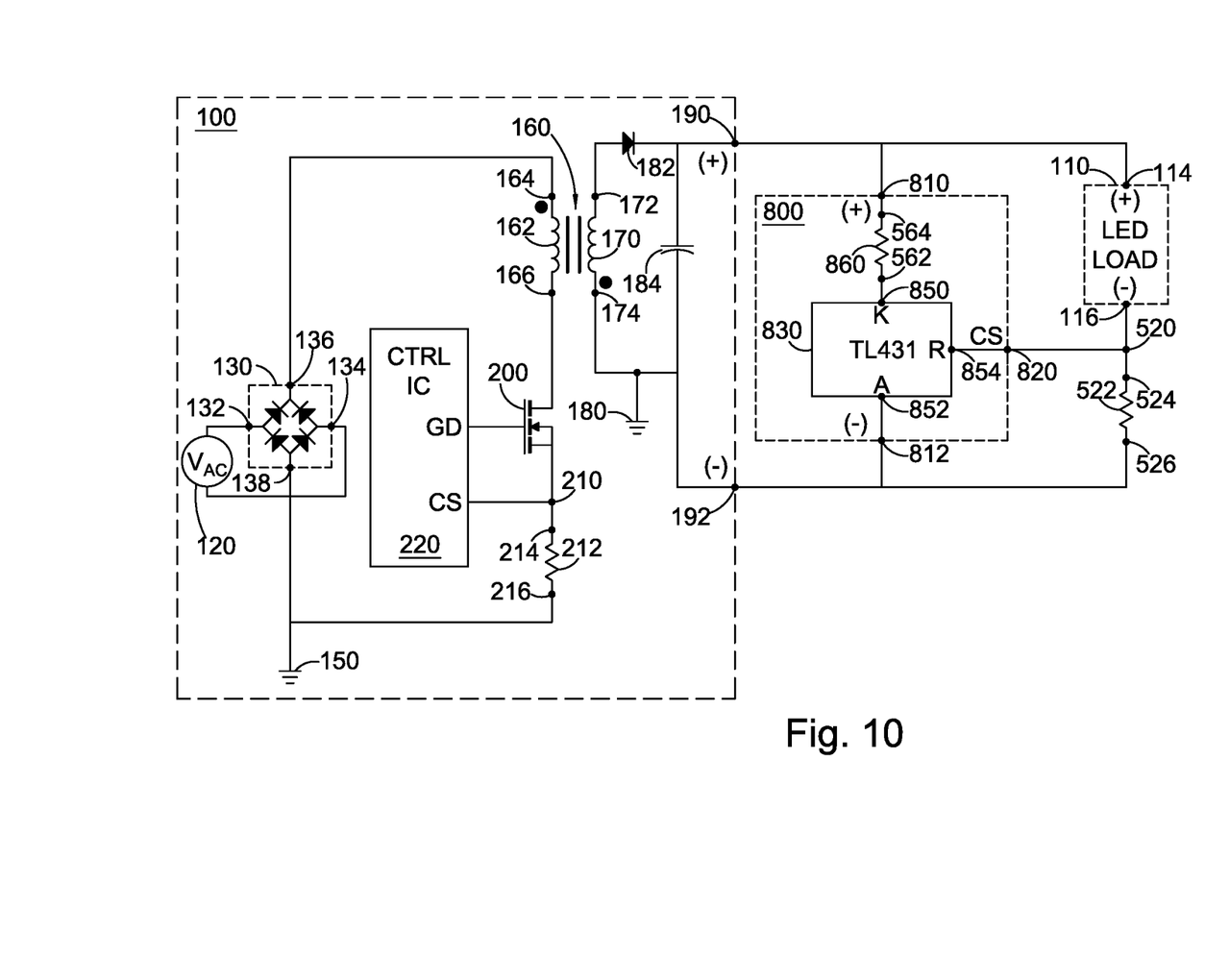
FIG. 10 illustrates the combination of the LED driver circuit and the LED load of FIG. 1, and further including the current and ripple control circuit of FIG. 8.

FIG. 9 illustrates an internal block diagram of the TL431 shunt regulator 830 as provided by at least one of the suppliers. As illustrated the shunt regulator includes an NPN bipolar transistor 900 having a collector connected to the cathode (K) terminal 850 of the shunt regulator and having an emitter connected to the anode (A) terminal 852 of the shunt regulator. The base of the transistor is connected to the output of an operational amplifier 910 having a noninverting (+) input and an inverting (−) input. The noninverting input of the operational amplifier is connected to the reference (R) terminal 854 of the shunt regulator. The inverting input is connected to the output of an internal voltage reference 920, which has a ground reference connected to the anode (A) terminal. In the illustrated embodiment, the internal reference voltage on the inverting input of the operational amplifier is fixed at approximately 2.5 volts with respect to the cathode (K) terminal of the shunt regulator. Thus, the voltage on the reference (R) terminal of the shunt regulator is compared to the internal reference voltage. When the voltage on the reference (R) terminal is greater than the internal reference voltage, the operational amplifier generates a high level voltage on the output of the operational amplifier to drive the base of the transistor to cause the transistor to conduct. A greater difference between the voltage on the reference (R) terminal and the internal reference voltage increases the collector-emitter conduction of the transistor.

With the shunt regulator 830 connected as shown in FIG. 8, the current and ripple control circuit 800 operates by monitoring the voltage on the secondary sensing node 520 generated by the load current flowing through the secondary sensing resistor 522. When the voltage on the secondary sensing node exceeds the internal reference voltage of the shunt regulator, the transistor 900 (FIG. 9) conducts to provide a bypass current path from the first (+) input terminal 810 of the current and ripple control circuit 800 through the current-limiting resistor 860 to the cathode terminal 850 of the shunt regulator. The bypass current path continues through the transistor to the anode terminal 852 of the shunt regulator. The bypass current exits the current and ripple control circuit via the second (−) terminal 812 and flows to the secondary ground reference 180. As described above, the current-limiting resistor limits the maximum current through the shunt regulator when the transistor is fully turned on.

The resistance of the secondary sensing resistor 522 is selected such that when the desired load current is flowing through the sensing resistor, the voltage at the secondary sensing node is approximately equal to the internal reference voltage of the shunt regulator 830 (e.g., approximately 2.5 volts in the illustrated embodiment). Thus, for a desired load current of approximately 50 milliamperes, the resistance of the sensing resistor is selected to be approximately 50 ohms. When the load current exceeds 50 milliamperes, the voltage at the secondary sensing node exceeds 2.5 volts, which causes the shunt regulator to provide a bypass path for current from the first (+) terminal 810 to the ground reference 180 to reduce the load current available to the LED load 110. The shunt regulator will turn off as the sensed load current decrease to the desired magnitude (e.g., the load current set point). The load current set point can be increased by reducing the resistance of the sensing resistor. The load current set point can be decreased by increasing the resistance of the sensing resistor. When the load current is maintained at the illustrated set point of 50 milliamperes, the power dissipated in the sensing resistor is approximately 125 milliwatts. Thus, the sensing resistor can be a relatively small ⅛ watt resistor.

Figure 11:
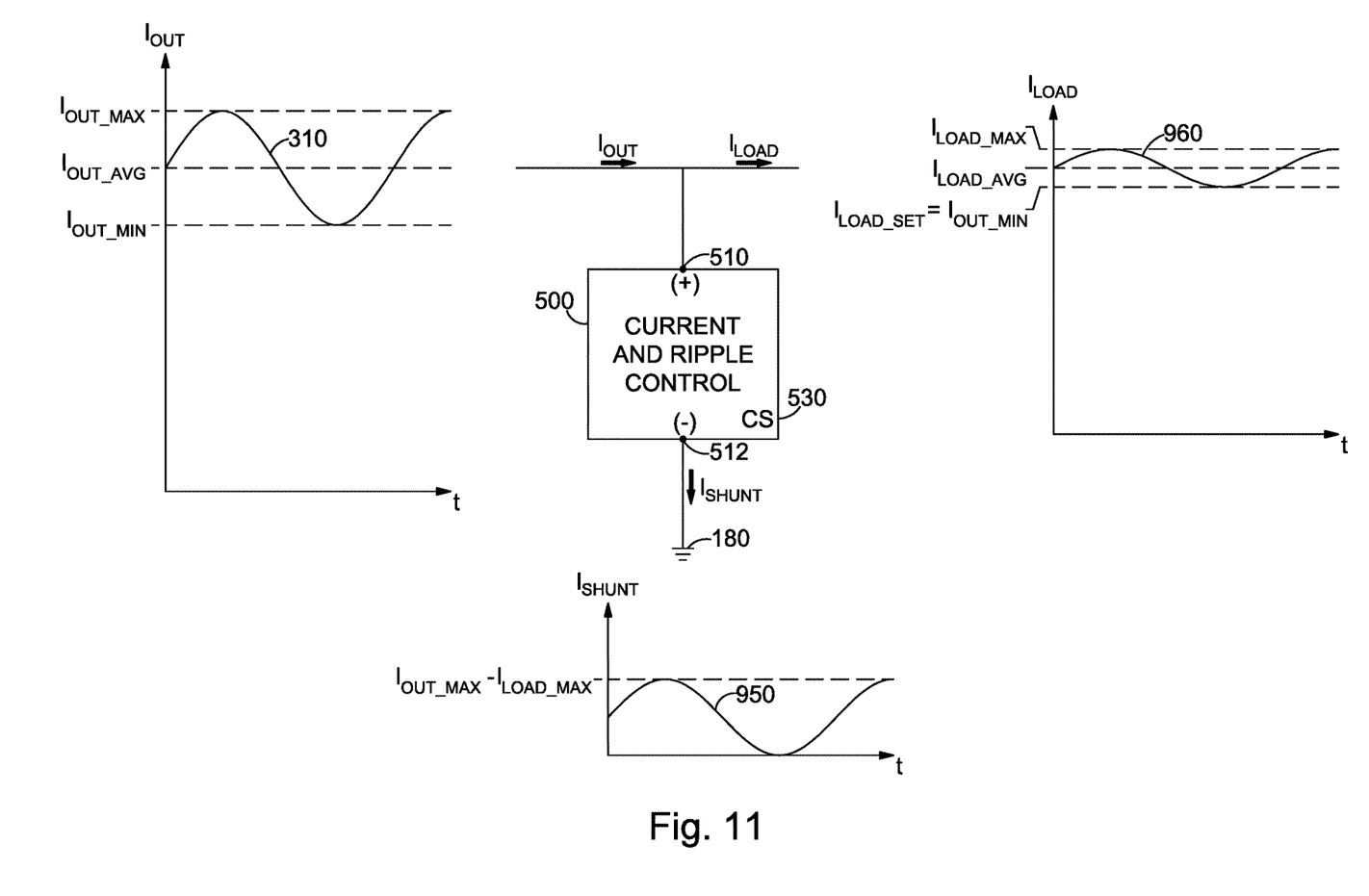
FIG. 11 illustrates the effect of the current and ripple control circuit on the current provided to the LED load.

The operation of the foregoing circuits is illustrated in FIG. 11 wherein the current and ripple control circuit 500 of FIG. 5 is shown as before. The current and ripple control circuit can be implemented, for example, as the current and ripple control circuit 600 of FIG. 6 or as the current and ripple control circuit 800 of FIG. 8. The first (+) terminal 510 of the current and ripple control circuit is connected to the LED driver 100 (see FIG. 5), which provides the output current $I_{OUT}$. The output current is represented by the $I_{OUT}$ waveform 310, which corresponds to the $I_{OUT}$ waveform 310 in FIG. 3. The current and ripple control circuit selectively diverts a portion ($I_{SHUNT}$) of the output current to the secondary ground reference 180 via the second (−) terminal 512. The non-diverted portion of the output current is provided as the load current ($I_{LOAD}$) to the LED load 110 (see FIG. 5).

The diverted portion of the output current is illustrated by an $I_{SHUNT}$ waveform 950 in FIG. 11. The non-diverted portion of the output current is illustrated by an $I_{LOAD}$ waveform 960 in FIG. 11. As illustrated by the $I_{LOAD}$ waveform, the load portion of the current comprises a DC component having a minimum magnitude of $I_{LOAD\_SET}$, which is set to the $I_{OUT\_MIN}$ magnitude shown in FIG. 3. The load portion of the current further includes a ripple component, which is added to the DC component such that the overall magnitude of the load current varies from a lower (minimum) magnitude of $I_{LOAD\_SET}$ to an upper (maximum) magnitude of $I_{LOAD\_MAX}$. Thus, the load current has a range of magnitudes between $I_{LOAD}$ SET and $I_{LOAD\_MAX}$. The load current has an average magnitude of $I_{LOAD\_AVG}$. The percentage of ripple of the load portion of the current can be determined by the following relationship:

$$\text{RIPPLE }(\%)_{I_{LOAD}} = \left[\frac{I_{LOAD\_MAX} - I_{LOAD\_SET}}{I_{LOAD\_AVG}}\right] \times 100$$

The diverted portion of the output current, represented by the $I_{SHUNT}$ waveform 950 in FIG. 11 has a magnitude that varies between zero and $I_{OUT\_MAX} - I_{LOAD\_MAX}$.

As shown by comparing the results in Table 2 with the results in Table 1, the current and ripple control circuit 500 (as embodied in the current and ripple control circuit 850 in FIG. 8, for example) reduces the percentage of ripple in the load current $I_{LOAD}$ applied to the LED load 110 to a range of approximately 9.11% to approximately 11.60% in comparison to the much broader range of approximately 14.05% to approximately 30.61% for the load current $I_{LOAD}$ applied to the LED load without the current and ripple control circuit as shown in FIG. 1.

The waveforms of FIG. 11 illustrate the ability of the current and ripple control circuit 500 to respond to the rapid (e.g., 120 Hz) changes in the output current $I_{LOAD}$ caused by the quasi-AC ripple component 322 (FIG. 4). The current and ripple control circuit is also responsive to configuration changes that result in variations in the input voltages applied to the input of the LED driver circuit 100 and to differences in the number of LEDs 112 applied to the output of the driver circuit. Since the configuration changes to not occur often, the current and ripple control circuit only has to adapt to the configuration changes each time the LED driver circuit is powered up. Thus, the improvements in line regulation and load regulation percentages are more apparent when comparing Table 2 to Table 1.

The previous detailed description has been provided for the purposes of illustration and description. Thus, although there have been described particular embodiments of the present invention of a new and useful "Circuit and Method for LED Current Regulation and Ripple Control," it is not intended that such references be construed as limitations upon the scope of this invention except as set forth in the following claims.

What is claimed is:

1. A circuit for providing a load current to a load comprising:
   a driver circuit having an isolation transformer that includes a primary winding and a secondary winding, the driver circuit comprising a flyback converter controller that is configured to selectively apply a pulsing DC voltage to the primary winding to generate a current in the secondary winding, the secondary winding coupled to a diode configured to provide a rectified secondary current to charge a secondary filter capacitor, the secondary filter capacitor connected between a first output terminal and a second output terminal, the driver circuit including a sensing resistor in series with the primary winding of the isolation transformer, the sensing resistor configured to generate a primary sensed voltage responsive to the rectified secondary current, the flyback converter controller configured to respond to the magnitude of the primary sensed voltage to control the magnitude of the rectified secondary current to maintain the magnitude of the rectified secondary current within a first range of magnitudes between a first lower magnitude and a first upper magnitude, a difference between the first upper magnitude and the first lower magnitude being a first magnitude difference;
   a secondary sensing resistor having a first resistor terminal connected to the first output terminal and having a second resistor terminal connectable to a load, the second output terminal connectable to the load, the secondary sensing resistor configured to generate a secondary sensed voltage proportional to the load current flowing through the secondary sensing resistor; and
   a current regulator connected between the first and the second output terminals, the current regulator including a reference voltage, the current regulator configured to receive the secondary sensed voltage from the secondary sensing resistor and to selectively enable a shunt current to pass through the current regulator when the secondary sensed voltage exceeds the reference voltage to divert a portion of the rectified current from the load, the current regulator configured to control the current through the secondary sensing resistor to a controlled current magnitude that varies within a second range of magnitudes between a second lower magnitude and a second upper magnitude, a difference between the second upper magnitude and the second lower magnitude being a second magnitude difference, the second magnitude difference as a percentage of the second lower magnitude less than the first magnitude difference as a percentage of the first lower magnitude.

2. The circuit for providing a load current to a load as defined in claim 1, wherein the current regulator comprises:
   an amplifier having an input connected to the second resistor terminal, the amplifier configured to amplify the secondary sensed voltage to generate an amplified voltage;
   a comparator configured to compare the amplified voltage to a reference voltage, the comparator further configured to generate a comparator output signal, the comparator output signal having a first voltage level when the amplified voltage is greater than the reference voltage and having at least a second voltage level when the amplified voltage is less than the reference voltage; and
   a transistor having a first transistor terminal, a second transistor terminal and a controllable current path between the first and second transistor terminals, the first transistor terminal coupled to the first output terminal, the second transistor terminal coupled to the second output terminal, the controllable current path controllable by a control terminal of the transistor to have a variable conductance, the control terminal coupled to receive a voltage responsive to the comparator output signal, the transistor configured to respond to the comparator output signal to control the conductance of the current path to selectively increase or decrease the shunt current through the current regulator.

3. The circuit for providing a load current to a load as defined in claim 1, wherein the current regulator comprises a shunt regulator, the shunt regulator including:
   a first regulator terminal coupled to the first output terminal;
   a second regulator terminal coupled to the second output terminal; and
   a voltage sensing terminal coupled the second resistor terminal to receive the secondary sensed voltage;
   an internal voltage reference configured to provide an internal reference voltage; and
   an electrical path between the first terminal of the shunt regulator and the second terminal of the shunt regulator, the electrical path having a variable conductivity, the shunt regulator configured to respond to the secondary sensed voltage to increase the variable conductivity of the electrical path to increase current flow through the shunt regulator when the secondary sensed voltage is greater than the internal reference voltage and to decrease the variable conductivity of the electrical path to decrease current flow through the shunt regulator when the second sensed voltage is less than the internal reference voltage.

4. A circuit for providing a load current to a load comprising:

a current source configured to generate an output current having a nominal DC magnitude between a current output node and a reference node, the output current varying with respect to the nominal DC magnitude by a time varying magnitude;

a sensing resistor having a first resistor terminal and a second resistor terminal, the first resistor terminal connected to one of the current output node and the reference node, the second resistor terminal and the other of the current output node and the reference node configured to provide a first portion of the output current as a load current, the sensing resistor configured to generate a sensed voltage proportional to the load current; and a current regulator connected between the current output node and the reference node to receive a shunt current comprising at least a second portion of the output current, the current regulator configured to receive the sensed voltage and to selectively increase or decrease the shunt current to reduce the effect of the time varying magnitude of the output current on the load current, wherein the current regulator comprises:

an amplifier configured to amplify the sensed voltage to generate an amplified voltage;

a comparator configured to compare the amplified voltage to a reference voltage, the comparator configured to generate a comparator output signal, the comparator output signal having at a first voltage level when the amplified voltage is greater than the reference voltage and having at least a second voltage level when the amplified voltage is less than the reference voltage; and a transistor having a first transistor terminal, a second transistor terminal and a controllable current path between the first and second transistor terminals, the first transistor terminal coupled to the current output node of the current source and, the second transistor terminal coupled to the reference node of the current source, the controllable current path controllable by a control terminal of the transistor to have a variable conductance, the control terminal of the transistor coupled to receive a voltage responsive to the comparator output signal, the transistor configured to respond to the comparator output signal to control the conductance of the current path to selectively increase or decrease the shunt current through the current regulator.

5. A circuit for providing a load current to a load comprising:

a current source configured to generate an output current having a nominal DC magnitude between a current output node and a reference node, the output current varying with respect to the nominal DC magnitude by a time varying magnitude;

a sensing resistor having a first resistor terminal and a second resistor terminal, the first resistor terminal connected to one of the current output node and the reference node, the second resistor terminal and the other of the current output node and the reference node configured to provide a first portion of the output current as a load current, the sensing resistor configured to generate a sensed voltage proportional to the load current; and a current regulator connected between the current output node and the reference node to receive a shunt current comprising at least a second portion of the output current, the current regulator configured to receive the sensed voltage and to selectively increase or decrease the shunt current to reduce the effect of the time varying magnitude of the output current on the load current, wherein the current regulator comprises a shunt regulator, the shunt regulator including:

a first regulator terminal coupled to the current output node of the current source;

a second regulator terminal coupled to the reference node of the current source; and a voltage sensing terminal coupled to the sensing resistor to receive the sensed voltage;

an internal voltage reference configured to provide an internal reference voltage; and an electrical path between the first regulator terminal and the second regulator terminal, the electrical path having a variable conductivity, the shunt regulator configured to respond to the sensed voltage to increase the variable conductivity of the electrical path to increase current flow through the shunt regulator when the sensed voltage is greater than the internal reference voltage and to decrease the variable conductivity of the electrical path to decrease current flow through the shunt regulator when the sensed voltage is less than the internal reference voltage.

6. A method for controlling a load current to a light-emitting diode (LED) load comprising:

generating an output current controlled to maintain a magnitude of the output current between a first lower magnitude and a first upper magnitude, a difference between the first lower magnitude and the first upper magnitude being a first magnitude difference corresponding to a first percentage of variation with respect to the first lower magnitude;

applying a first portion of the output current to a current shunt;

applying a second portion of the output current to the LED load to cause the second portion of the output current to flow through the LED load;

sensing a feedback signal responsive to a magnitude of the second portion of the output current; and applying the feedback signal to the current shunt, the current shunt responsive to the feedback signal to selectively vary a magnitude of the first portion of the output current to thereby vary the magnitude of the second portion of the output current to maintain the second portion of the output current between a second lower current magnitude and a second upper current magnitude, a second magnitude difference between the second upper current magnitude and the second lower current magnitude corresponding to a second percentage of variation with respect to the second lower magnitude, the second percentage of variation less than the first percentage of variation.

* * * * *